(12) United States Patent
Le Gall

(10) Patent No.: US 11,326,477 B2
(45) Date of Patent: May 10, 2022

(54) METHOD FOR ASSEMBLING A TURBOMACHINE

(71) Applicant: SAFRAN AIRCRAFT ENGINES, Paris (FR)

(72) Inventor: Remy Le Gall, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 383 days.

(21) Appl. No.: 16/626,856

(22) PCT Filed: Jun. 20, 2018

(86) PCT No.: PCT/FR2018/051478
§ 371 (c)(1),
(2) Date: Dec. 26, 2019

(87) PCT Pub. No.: WO2019/002725
PCT Pub. Date: Jan. 3, 2019

(65) Prior Publication Data
US 2021/0148253 A1 May 20, 2021

(30) Foreign Application Priority Data
Jun. 27, 2017 (FR) ...................................... 1755886

(51) Int. Cl.
*B23P 15/04* (2006.01)
*F01D 25/28* (2006.01)

(52) U.S. Cl.
CPC .............. *F01D 25/28* (2013.01); *B23P 15/04* (2013.01); *F05D 2220/32* (2013.01);
(Continued)

(58) Field of Classification Search
CPC ........ F01D 25/28; F01D 25/285; B23P 15/04; F05D 2220/32; F05D 2230/64;
(Continued)

(56) References Cited

U.S. PATENT DOCUMENTS 4,964,224 A * 10/1990 Jackson .................... G01B 5/25
33/645
8,533,965 B2 * 9/2013 Stromberg ............. G01B 11/27
33/412

(Continued)

FOREIGN PATENT DOCUMENTS

| DE | 102015214667 | 2/2017 |
| EP | 1752409 | 2/2007 |
| KR | 1020130078698 | 7/2013 |

OTHER PUBLICATIONS

"Search Report," PCT/FR2018/051478 (dated Oct. 2, 2018).

*Primary Examiner* — Ryan J. Walters
(74) *Attorney, Agent, or Firm* — Womble Bond Dickinson (US) LLP

(57) ABSTRACT

Method for assembling a turbomachine (1) by means of a device (10), the turbomachine comprising at least two modules (3) which are assembled by the insertion of a shaft of one of the modules into a housing of the other of the modules, the device comprising: means (11) for supporting a first of the modules, means (20, 21) for suspending a second of the modules and for moving this second module along an axis of movement (Z), a laser beam emitter (30) intended to be fixed to the said first module and configured to emit a laser beam (31) that coincides with a longitudinal axis (X) of this first module, and a target (40) intended to be fixed to the said suspension and movement means so that it can be moved along the said axis of movement, and so that in at least two axial positions on this axis which are distant from one another, a spot from the said laser beam is located at the centre of the said target, the method being characterized in that it comprises the steps of: a) positioning the said first module (3) on the said support means (11), b) fixing the said target (40) to the said suspension and movement means, c) determining a first axial position of the said target, for
(Continued)

which position a spot from the said laser beam (31) is positioned at the centre of the said target, d) moving the said target along the said movement axis (Z), and e) determining a second axial position of the said target, for which position a spot from the said laser beam is located at the centre of the said target, so as to validate the parallelism between the said longitudinal axis (X) of the said first module and the said movement axis.

9 Claims, 3 Drawing Sheets

(52) U.S. Cl.
CPC ...... *F05D 2230/64* (2013.01); *F05D 2230/70* (2013.01); *F05D 2240/90* (2013.01)

(58) Field of Classification Search
CPC ............. F05D 2230/70; F05D 2240/90; F05D 2250/311; F02C 7/20
See application file for complete search history.

(56) References Cited

U.S. PATENT DOCUMENTS

| | | | |
|---|---|---|---|
| 8,689,455 B2 * | 4/2014 | Smith | F01D 25/285 33/645 |
| 9,821,410 B2 * | 11/2017 | Zollinger | B23K 26/20 |
| 11,241,762 B2 * | 2/2022 | Schuring | B23P 15/04 |
| 2013/0219733 A1 | 8/2013 | Smith et al. | |
| 2020/0325797 A1 * | 10/2020 | Wright | F01D 25/285 |

* cited by examiner

METHOD FOR ASSEMBLING A TURBOMACHINE

FIELD OF THE INVENTION

The present invention relates to the field of turbomachines and more specifically to multi-body gas turbomachines. It relates to engine assembly operations and in particular, to the assembly of the low-pressure turbine module on a high-pressure body.

STATE OF THE ART

A twin-spool turbojet engine, with a front fan for example, comprises a high-pressure HP body and a low-pressure LP body. The LP body rotates at a first speed and comprises an LP turbine downstream from the HP body, driving the front fan. The HP body rotates at a speed that is different from the speed of the LP turbine. The shafts of the two bodies are concentric and the shaft of the LP body passes through the inside of the shaft of the HP body. The shaft of the LP body is rotationally guided by bearings supported by the fixed structure of the engine, respectively located downstream from the turbine and upstream from the high-pressure compressor. The shaft of the HP body is rotationally guided by bearings supported upstream by the fixed structure of the engine and downstream by the shaft of the LP body, by means of an inter-shaft bearing. This bearing is of the roller type and is located, at least according to one known engine, between the high-pressure turbine and the low-pressure turbine. This type of bearing comprises an inner ring provided with rollers maintained by a cage on the shaft of the LP body, and an outer ring, generally mounted by cold-clamping in the shaft of the HP body. The mounting of this bearing, i.e. the assembly of the outer ring with the unit formed by the rollers, the cage and the inner ring, is carried out at the same time as the docking of the low-pressure turbine, during which the shaft, which has been mounted with the low-pressure turbine beforehand, is guided in the HP body. The term "docking" is here used to describe the translational movement, in part or in full, of the low-pressure turbine module until the flange of the outer casing thereof is in contact with the corresponding flange of the module constituting the HP body.

As a result, the inter-shaft bearing is mounted blind. The operator has no visibility to monitor, specifically, whether the rollers are properly engaged in the rotor of the HP body, and then in the outer ring. This operation poses a high risk of damaging the bearing if it is not conducted under fully controlled conditions. The greatest risk for the bearing is a hard contact of the rollers with the retaining nut of the outer ring and the ring itself.

It is known, for example through document FR-A1-2 890 110, to use techniques that make it possible to conduct a controlled heating of the part supporting the outer ring in order to facilitate the contactless introduction of the rollers.

However, even with the expansion of the outer ring, it is important to ensure accurate positioning of the shaft of the LP body to avoid contact. The known practice of centering the shaft of the LP body with a ruler lacks in accuracy and leads to mounting incidents that can result in sub-standard quality and even to damaged parts, which then require changing by disassembling at least partially the modules of the assembled turbomachine. Document FR-A1-2 890 110 proposes using laser measurements with instruments mounted on a removable support that is positioned with respect to the HP body, but this instrumentation is expensive and the implementation thereof is complex.

There is therefore a need for a simple technique to position the shaft of the LP module with respect to the outer ring of the HP body, with sufficient accuracy to reduce the risks of hard contact with the elements of the inter-shaft bearing. More generally, there is a need for a simple method for assembling a turbomachine comprising at least two modules which are assembled by insertion of a shaft of one of the modules into a housing of the other module.

SUMMARY OF THE INVENTION

To this end, the invention relates to a method for assembling a turbomachine, by means of a device, the turbomachine comprising at least two modules assembled by insertion of a shaft of one of the modules into a housing of the other module, the device comprising:
 support means of a first of the modules,
 suspension and movement means of a second of the modules along a movement axis,
 a laser beam emitter intended to be fixed to said first module and configured to emit a laser beam that coincides with a longitudinal axis of this first module, and
 a target intended to be fixed to said suspension and movement means, such that it can be moved along said movement axis, and such that in at least two axial positions on this axis, a mark from said laser beam is located at the centre of said target.

The method according to the invention comprises the steps of:
 a) positioning said first module on said support means,
 b) fixing said target to said suspension and movement means,
 c) determining a first axial position of said target, for which a mark of said laser beam is located at the centre of said target,
 d) moving said target along said movement axis, and
 e) determining a second axial position of said target, for which a mark of said laser beam is located at the centre of said target, in order to validate the parallelism between said longitudinal axis of said first module and said movement axis.

The purpose of the laser beam is to simulate the longitudinal axis of the first module. This axis must be substantially parallel with the movement axis to enable the assembly of the modules, and in particular to prevent contact during the docking. To ensure this parallelism, in at least two separate axial positions of the target along the movement axis, the mark of the laser beam must be centred on the target. The invention can therefore use one single laser beam emitter and one single target.

The device can comprise one or more of the following features, taken individually or in combination:
 said support means are configured to enable the adjustment of the positioning of said first module in at least one direction substantially perpendicular to said longitudinal axis of said first module;
 said support means are configured to enable the adjustment of the positioning of said first module in two directions substantially perpendicular to one another and to said longitudinal axis of said first module;
 said suspension and movement means comprise at least one hoist suspended from a girder and capable of being moved along the girder defining said movement axis;
 said first module is the module comprising said housing;

said emitter is housed in said housing of said first module;
the distance between said first and second axial positions is greater than or equal to 1 metre, and for example, between 2 and 3 metres.

The method for assembling a turbomachine, by means of a device as described above, comprises the steps of:
a) positioning said first module on said support means,
b) fixing said target to said suspension and movement means,
c) determining a first axial position of said target, for which position a mark from said laser beam is located at the centre of said target,
d) moving said target along said movement axis, and
e) determining a second axial position of said target, for which position a mark of said laser beam is located at the centre of said target, so as to validate the parallelism between said longitudinal axis of said first module and said movement axis.

Step a) can be carried out prior to or after step b).

The method can comprise the following steps of:
f) disassembling said target from said suspension and movement means,
g) fixing said second module to said suspension and movement means, and
h) inserting said first and second modules into one another, by moving said second module along said movement axis.

Preferably, said first axial position is located in the vicinity of said first module.

Advantageously, the method comprises, between steps d) and e), sub-steps of:
verifying the position of said mark on said target, and
adjusting the position of the first module such that said mark is to located at the centre of said target.

BRIEF DESCRIPTION OF THE FIGURES

The invention will be better understood, and other details, features and advantages of the present invention will become clearer upon reading the following description, provided by way of an example and not limited thereto, and with reference to the appended drawings, wherein.

DESCRIPTION OF SEVERAL EMBODIMENTS

Figure 1:
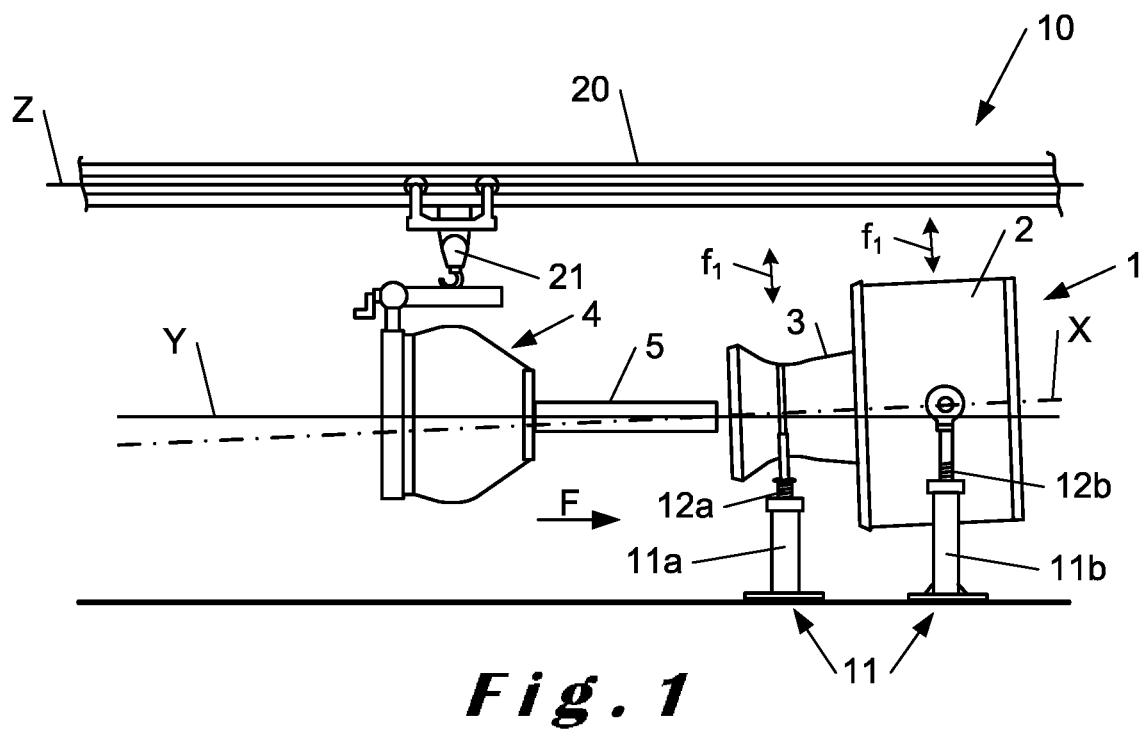
FIG. 1 is a schematic side view of a device for the assembly of a turbomachine used in the method according to the invention; two modules of the turbomachine being mounted on the device.
Figure 3:
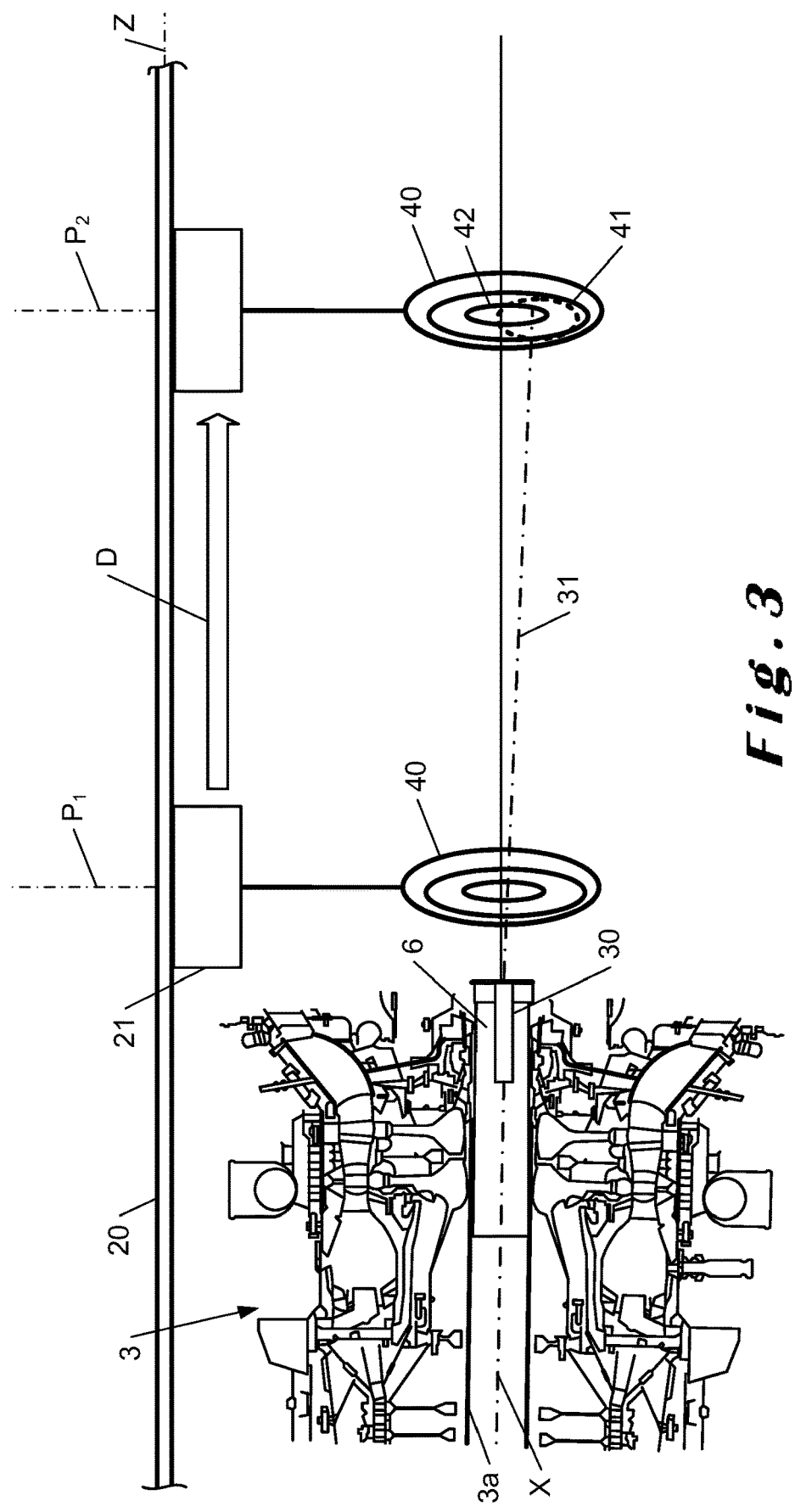
FIG. 3 is another schematic side view of the device of FIG. 1 equipped with the target and of one of the modules, here along an axial cross-section.

FIG. 1 shows a turbomachine 1 during assembly, at the beginning of the docking operation defined above. In this case, it is a twin-spool turbojet engine. It comprises a front fan 2 and a high-pressure module, termed first module 3, consisting of the high-pressure body with the shaft 3a thereof, termed first shaft, which can be seen in FIG. 3. These elements have already been assembled.

In the example, the low-pressure turbine module, termed second module 4, is assembled, of which the shaft 5, termed second shaft, must be engaged in the high-pressure body following the direction of the arrow F, parallel with the longitudinal axis X of the first module 3. This longitudinal axis X is substantially horizontal during assembly.

Below, in the description, the assembly of the second module 4 in the first module 3 will therefore be described. The terms "upstream" and "downstream" are used with reference to the longitudinal axis X based on the primary direction of flow of the gases, from the high-pressure body towards the low-pressure turbine.

In the downstream end thereof, the first module 3 comprises a housing 6 wherein the shaft 5 of the second module 4 is intended to be housed. This shaft 5 extends along the longitudinal axis Y of the second module 4.

The drawings show an example embodiment of a device 10 for the assembly of the turbomachine 1. The device 10 comprises means 11 for supporting the first module 3, and means for suspending the second module 4, and for moving this second module 4 along a movement axis Z.

Figure 2:
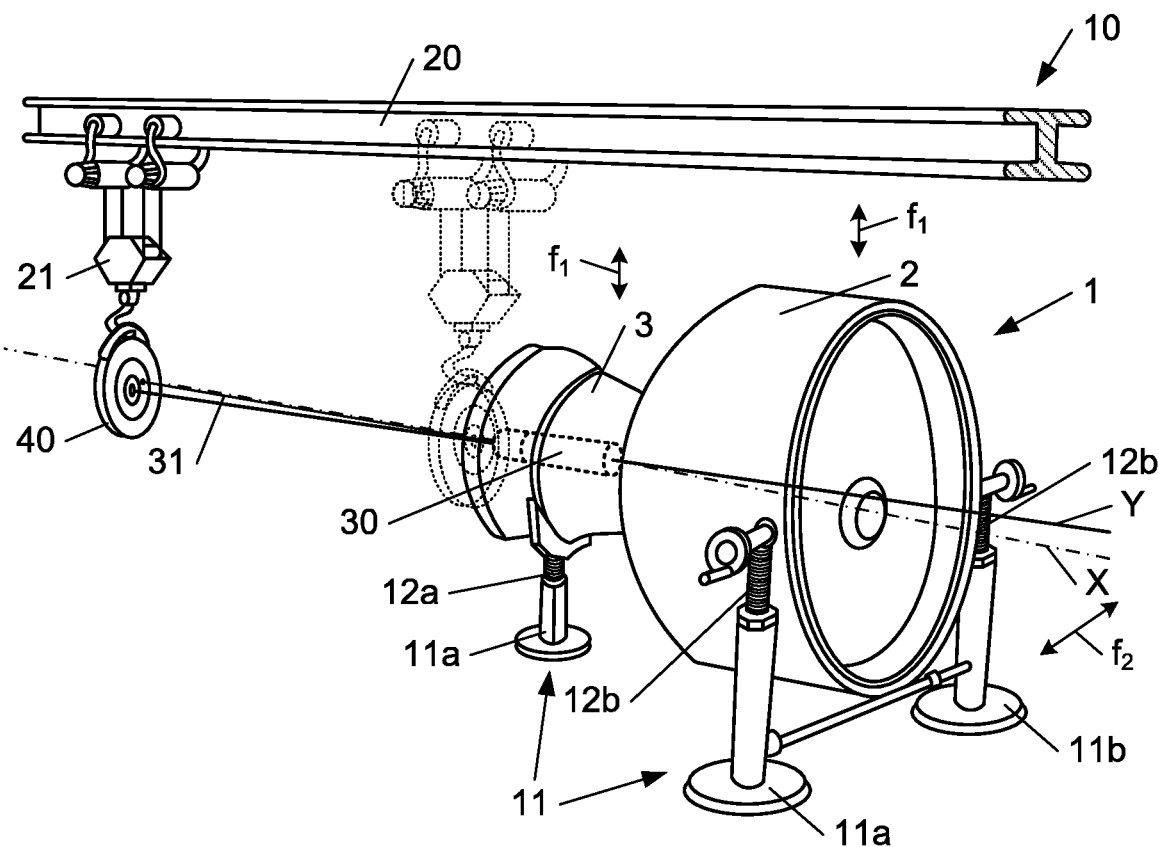
FIG. 2 is another schematic perspective view of the device of FIG. 1, one of the modules being mounted on the device and a target also being mounted on the device instead of the other module.
Figure 4:
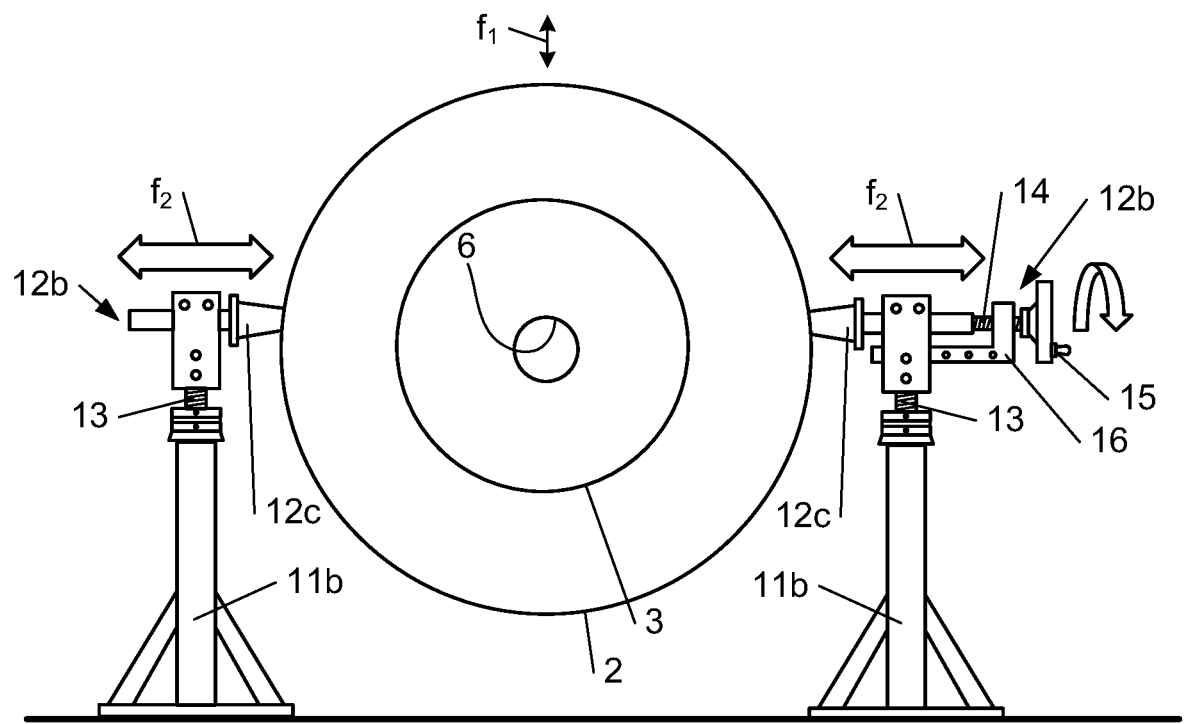
FIG. 4 is a schematic front view of a module mounted on the support means of the device of FIG. 1.

The support means 11 can be seen in FIGS. 1, 2 and 4. They comprise a first support 11a of the downstream end of the first module 3 and a second support 11b of the upstream end of the first module 3. The supports 11a, 11b are similar to a base resting on the ground.

The first support 11a can comprise means 12a for adjusting the positioning of the first module 3, preferably in a first vertical direction (double arrow f1). The second support 11b can comprise means 12b for adjusting the positioning of the first module 3, preferably in a first vertical direction (double arrow f1) and in a second horizontal direction (double arrow f2).

Figure 5:
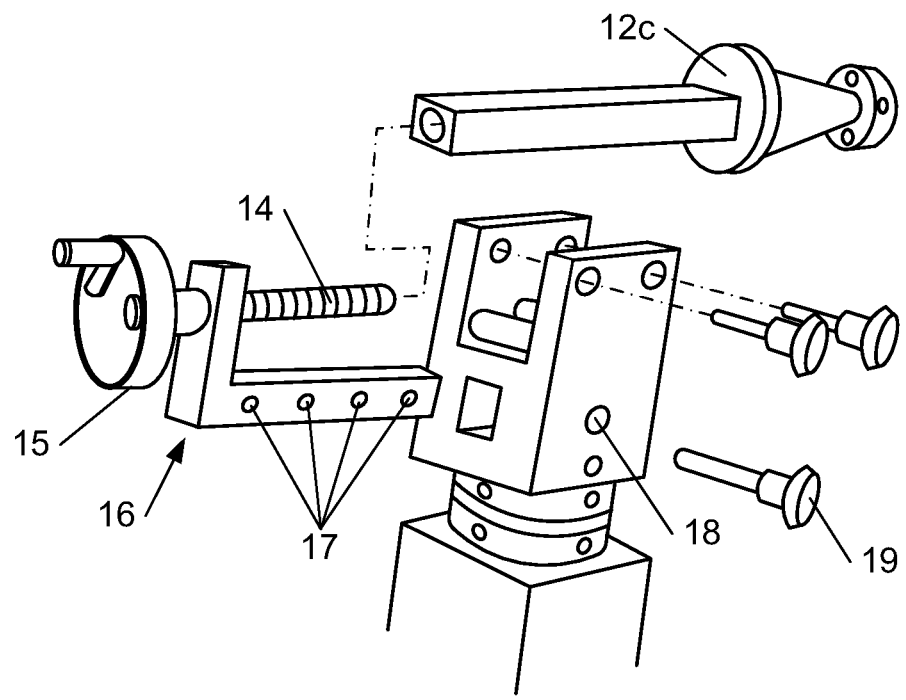
FIG. 5 is schematic and perspective exploded view of means for adjusting the support means of FIG. 4.

FIGS. 4 and 5 show an example embodiment of the adjustment means 12b.

The accuracy of the vertical adjustment of the means 12b, and of the means 12a, can be achieved by means of threaded rods 13 oriented vertically that can be screwed or unscrewed to adjust the height of the attachment means 12c to the first module 3. In addition, the accuracy of the horizontal adjustment of the means 12b can be achieved by means of another threaded rod 14 oriented horizontally and that can be screwed in the attachment means 12c or unscrewed from said attachment means, to adjust the position of the first module in a horizontal plane. The threaded rod 14 has an end engaged in a tapped orifice of the attachment means 12c and an opposite end connected to a flywheel 15. This flywheel 15 is mounted on a plate 16 that is attached removable to a head of one of the threaded rods 13. The plate 16 is L-shaped, one branch of which supports the flywheel 15, which is rotationally mobile about the axis thereof, the other branch being horizontal and comprising a series of holes 17. The abovementioned head of the threaded rod 13 comprises a throughhole 18 for the passage of a pin 19 intended to be engaged through this hole and to reach one of the holes 17 of the plate. One of the holes 17 of the plate is aligned with the hole 18 for the mounting of the pin 19, depending on the desired position of the attachment means in a horizontal direction. This engagement makes it possible for a rough adjustment of the horizontal position of the attachment means 12c and therefore of the first module 3, and the screwing/unscrewing of the threaded rod 14 in the attachment means 12c makes it possible for a more accurate adjustment of this position.

The suspension and movement means comprise a horizontal girder 20 from which a hoist 21 is suspended. The hoist 21 is capable of moving along the girder 20, which defines an axis Z of movement of the hoist 21.

The second module 4 is intended to be fixed to the hoist 21. It is fixed to the hoist 21 so that the axis Y thereof is parallel to the axis Z. To assemble modules 3, 4 of the turbomachine 1, the shaft of module 4 must be inserted in the housing 6 of the module 3. For this purpose, the axes X and Y must be parallel with one another. Since the axis Y is parallel with the axis Z, the axes X and Z must be parallel with one another.

The present invention makes it possible to achieve this objective quickly and reliably. The assembly device comprises
- a laser beam emitter 30 intended to be fixed to said module 3, and configured to emit a laser beam 31 that coincides with the axis X, and
- a target 40 intended to be fixed to the suspension and movement means, such that it can be moved along the axis Z.

The emitter 30 is for example, inserted in the housing 6 of the module 3 and immobilised in this housing 6 by appropriate means. It is mounted in the housing from the downstream portion of the module 3 and is oriented such that the laser beam 31 is orientated in the downstream direction.

The target 40 is fixed to the hoist 21 instead of the second module 4 and can therefore be moved along the axis Z. To ensure the parallelism of the axes X and Z, there must be at least two separate axial positions P1, P2, of the target 40 for which a mark 41 of the laser beam is located at the centre 42 of the target 40. Indeed, if two axial positions of the target 40 are identified as meeting this criterion, all the intermediate positions between the positions P1, P2 meet this criterion and the axes X and Z are parallel.

In practice, the positions P1, P2 are at a distance D of 2 to 3 metres from one another. The first position P1 is an axial position of the target 40 as close as possible to the first module 3. The target is thus positioned just downstream from the module 3, and the mark of the beam is inspected to confirm that it is centred on the target 40. If this is not the case, the position of the first module 3 is adjusted until the mark is located at the centre of the target. The adjustment is carried out with the means 12a, 12b.

The target 40 is then moved with the hoist 21 to the position P2 and the position of the mark of the beam on the target is verified. If this is not centred, the position of the first module 3 is adjusted until the mark is located at the centre of the target. The adjustment is carried out with the means 12a, 12b. In such a case, it is possible to verify once again whether the mark of the beam is properly centred on the target when the target is in the position P1.

The invention claimed is:

1. Method for assembling a turbomachine, by means of a device, the turbomachine comprising at least two modules assembled by insertion of a shaft of one of the modules into a housing of another one of the modules, the device comprising:
   support means for supporting a first of the modules,
   suspension and movement means for suspending and moving a second of the modules along a movement axis,
   a laser beam emitter intended to be fixed to said first module and configured to emit a laser beam that coincides with a longitudinal axis of this first module, and
   a target intended to be fixed to said suspension and movement means, such that it can be moved along said movement axis, and such that in at least two separate axial positions on this axis, a mark from said laser beam is located at the centre of said target,
   the method being wherein it comprises the steps of:
   a) positioning said first module on said support means,
   b) fixing said target to said suspension and movement means,
   c) determining a first axial position of said target, for which said mark of said laser beam is located at the centre of said target,
   d) moving said target along said movement axis, and
   e) determining a second axial position of said target, for which said mark of said laser beam is located at the centre of said target, in order to validate the parallelism between said longitudinal axis of said first module and said movement axis.

2. Method according to claim 1, wherein it comprises the following steps of:
   f) disassembling said target from said suspension and movement means,
   g) fixing said second module to said suspension and movement means, and
   h) inserting said first and second modules into one another, by moving said second module along said movement axis.

3. Method according to claim 1, wherein said first axial position is located in the vicinity of the first module.

4. Method according to claim 1, wherein it comprises, between steps d) and e), the sub-steps of:
   verifying the position of said mark on said target, and
   adjusting the position of the first module such that said mark is located at the centre of said target.

5. Method according to claim 1, wherein said support means are configured to enable the adjustment of the positioning of said first module in at least one direction substantially perpendicular to said longitudinal axis of said first module.

6. Method according to claim 1, wherein said support means are configured to enable the adjustment of the positioning of said first module in two directions substantially perpendicular to one another and to said longitudinal axis of said first module.

7. Method according to claim 1, wherein said suspension and movement means comprise at least one hoist suspended from a girder and able to be moved along the girder defining said movement axis.

8. Method according to claim 1, wherein said first module is the module comprising said housing.

9. Method according to claim 8, wherein said emitter is housed in said housing of said first module.

* * * * *